US 12,155,804 B2

(12) United States Patent
Hirose

(10) Patent No.: US 12,155,804 B2
(45) Date of Patent: Nov. 26, 2024

(54) NON-TRANSITORY COMPUTER-READABLE STORAGE MEDIUM, SERVER, SERVICE SYSTEM, AND SERVICE PROVIDING METHOD

(71) Applicant: BROTHER KOGYO KABUSHIKI KAISHA, Nagoya (JP)

(72) Inventor: Kasumi Hirose, Mizuho (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 170 days.

(21) Appl. No.: 17/699,215

(22) Filed: Mar. 21, 2022

(65) Prior Publication Data

US 2022/0321729 A1 Oct. 6, 2022

(30) Foreign Application Priority Data

Mar. 31, 2021 (JP) .................................. 2021-060261

(51) Int. Cl.
*H04N 1/34* (2006.01)
*G06F 3/12* (2006.01)
*G06Q 30/016* (2023.01)

(52) U.S. Cl.
CPC ........... *H04N 1/344* (2013.01); *G06F 3/1204* (2013.01); *G06F 3/1231* (2013.01); *G06Q 30/016* (2013.01); *H04N 1/346* (2013.01)

(58) Field of Classification Search
CPC ...... H04N 1/344; H04N 1/346; G06F 3/1204; G06F 3/1231; G06F 3/1224; G06F 3/1285; G06Q 30/016
See application file for complete search history.

(56) References Cited

U.S. PATENT DOCUMENTS

| 9,836,253 | B2 * | 12/2017 | Tomono ................ G06F 3/1285 |
| 10,205,982 | B2 * | 2/2019 | Thomas ........... H04N 21/25891 |
| 2004/0044690 | A1 * | 3/2004 | Kanzinger ........... G06Q 10/107 |
| 2019/0238711 | A1 | 8/2019 | Nagasaki | |

FOREIGN PATENT DOCUMENTS

| JP | 2014-10532 A | 1/2014 | |
| JP | 2014-179048 A | 9/2014 | |
| JP | 2018-190155 A | 11/2018 | |
| JP | 2019-133411 A | 8/2019 | |
| KR | 101754330 B1 * | 7/2017 | |
| WO | WO-2021167416 A1 * | 8/2021 | ........... G06Q 20/123 |

OTHER PUBLICATIONS

Sam Costello, How to Cancel Subscriptions on iPhone, Mar. 8, 2021, LifeWire Tech For Humans (Year: 2021).*

* cited by examiner

*Primary Examiner* — Florian M Zeender
*Assistant Examiner* — Emily M. Kraisinger
(74) *Attorney, Agent, or Firm* — KENEALY VAIDYA LLP

(57) ABSTRACT

A server has a service providing unit. The service providing unit determines whether a device already subscribes to at least one of one or more second services, in response to receiving a service request intended for a first service from an information processing apparatus. The first service includes a first function at least partially overlapping a second function of the one or more second services. The service providing unit guides a cancellation of a subscription for the second service to which the device already subscribes, in a case where it is determined that the device already subscribes to at least one of the one or more second services.

14 Claims, 13 Drawing Sheets

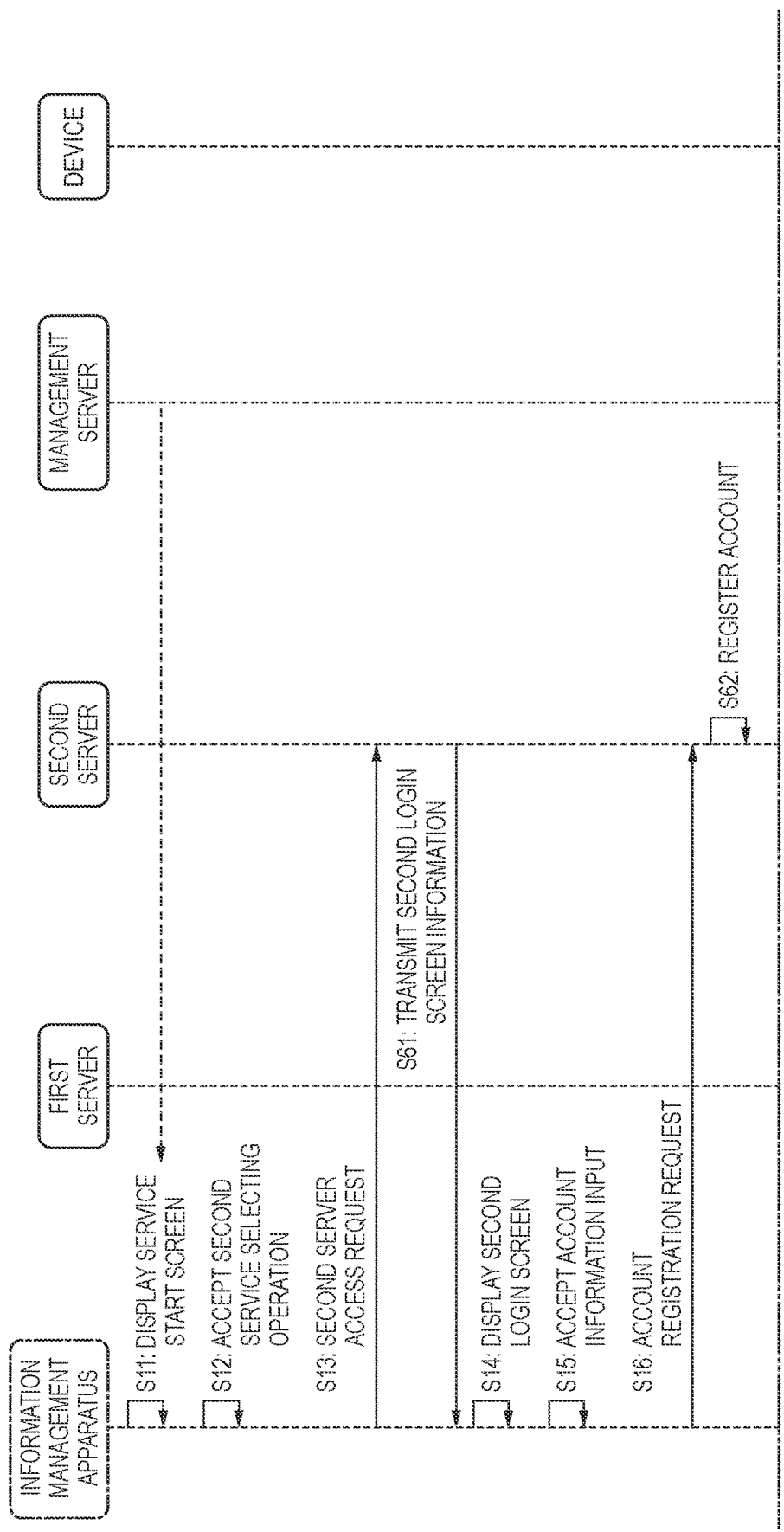

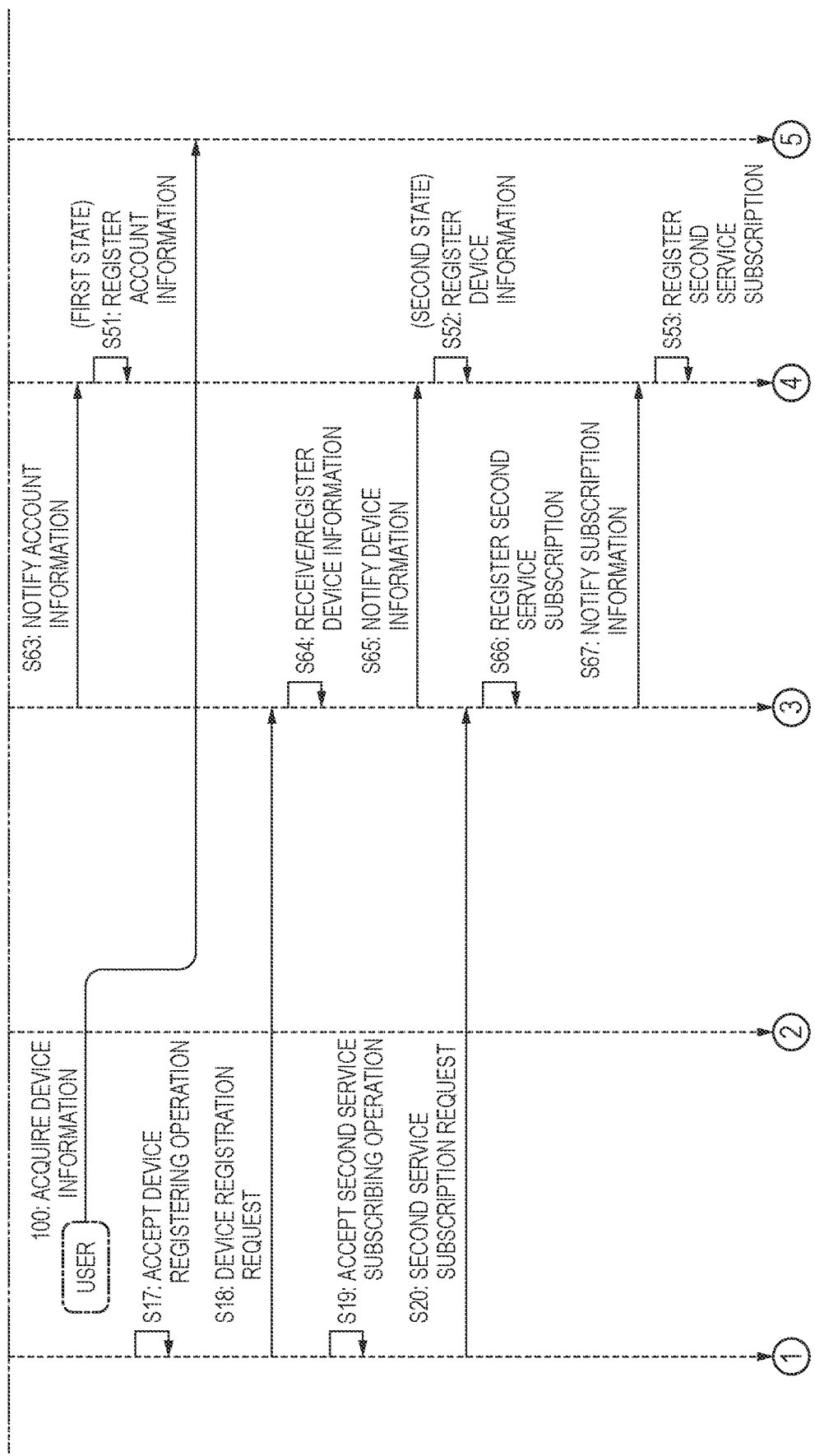

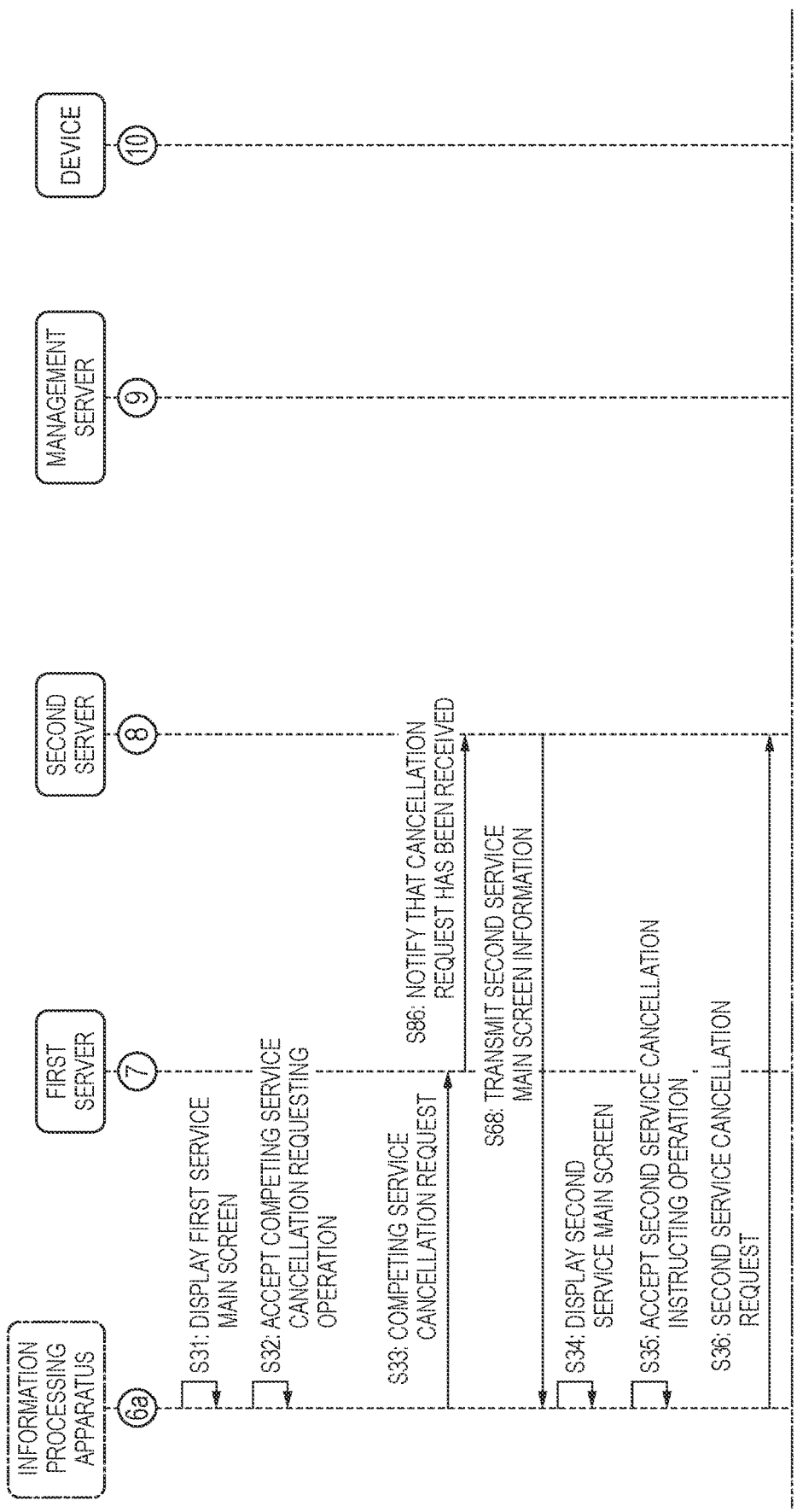

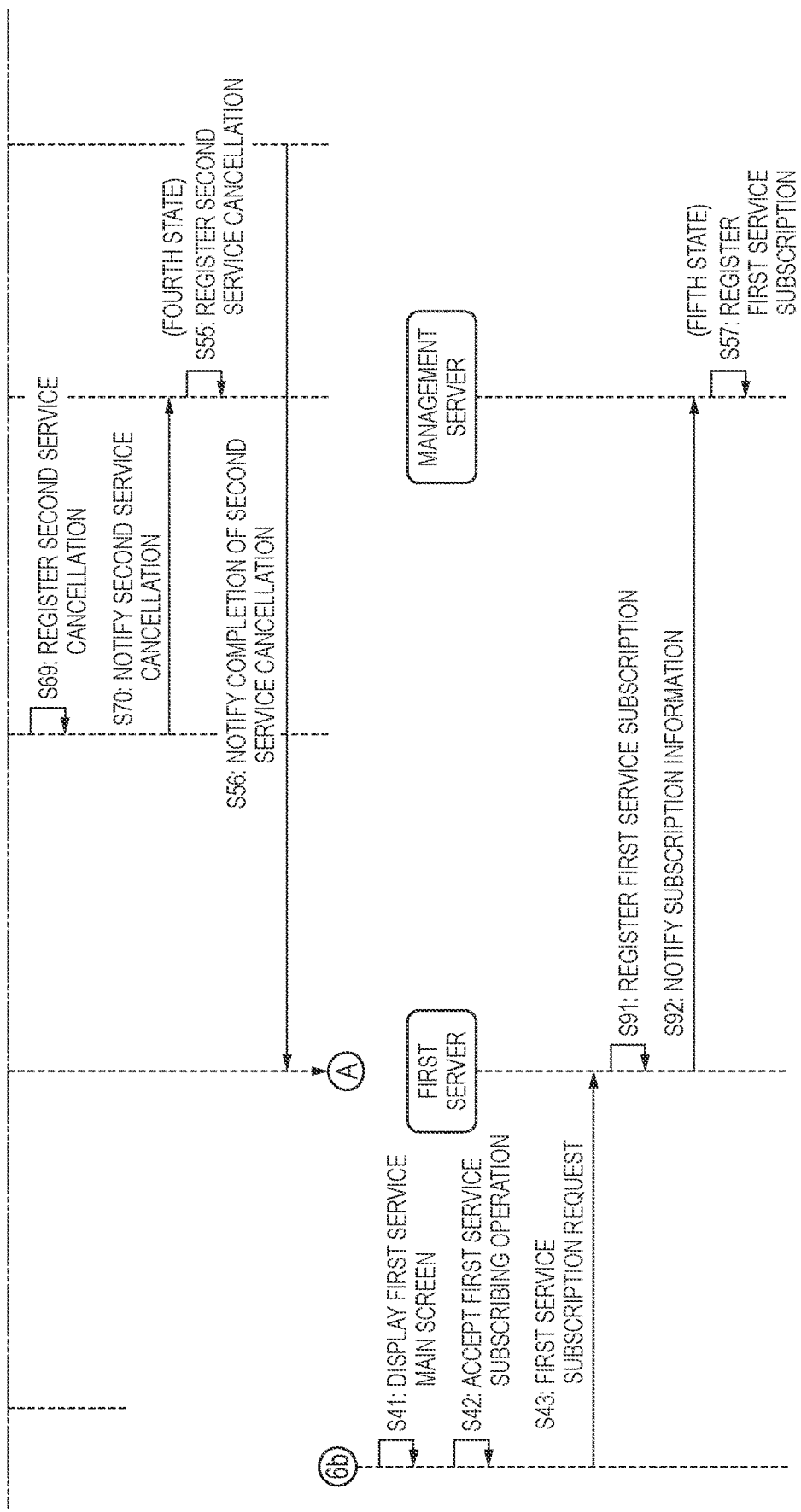

# NON-TRANSITORY COMPUTER-READABLE STORAGE MEDIUM, SERVER, SERVICE SYSTEM, AND SERVICE PROVIDING METHOD

CROSS-REFERENCE TO RELATED APPLICATION

This application is based upon and claims the benefit of priority from prior Japanese patent application No. 2021-060261 filed on Mar. 31, 2021, the entire contents of which are incorporated herein by reference.

TECHNICAL FIELD

The present disclosure relates to a technology of providing a service intended for a device such as a printer.

BACKGROUND

A variety of services intended for a printer are known. JP-A-2019-133411 discloses a shipping service for automatically shipping a new ink cartridge when an ink remaining amount in an ink cartridge mounted in a printer becomes small.

One printer can be caused to subscribe to a plurality of types of services. When one printer is caused to subscribe to a plurality of services, the same service menu may be duplicately provided from each of the plurality of services, depending on respective contents of the plurality of services. Duplicate provision of the same service menu may result in a useless service subscription situation for a user.

SUMMARY

An object of the present disclosure is to provide a technology whereby it is possible to suppress the same type of service menu from being duplicately provided from each of a plurality of services intended for a device such as a printer.

A first aspect of the present disclosure is a non-transitory computer-readable storage medium storing computer-readable instructions. The computer-readable instructions are executed by a computer of a server.

The computer-readable instructions cause the server to perform determining whether a device already subscribes to at least one of one or more second services, in response to receiving a service request intended for a first service from an information processing apparatus. The first service includes a first function at least partially overlapping a second function of the one or more second services.

The computer-readable instructions cause the server to perform guiding a cancellation of a subscription for the second service to which the device already subscribes, in a case where it is determined in the determining that the device already subscribes to at least one of the one or more second services.

A second aspect of the present disclosure is a server including a service providing unit configured to perform:
determining whether a device already subscribes to at least one of one or more second services, in response to receiving a service request intended for a first service from an information processing apparatus, the first service including a first function at least partially overlapping a second function of the one or more second services;
causing the device to subscribe to the first service, in a case where it is determined in the determining that the device does not subscribe to any of the one or more second services; and
guiding a cancellation of a subscription for the second service to which the device already subscribes, in a case where it is determined in the determining that the device already subscribes to at least one of the one or more second services.

A third aspect of the present disclosure is a service system including a server system, a device, and an information processing apparatus,
in which the information processing apparatus is configured to perform transmitting a service request intended for a first service to the server system, and
the server system is configured to perform:
determining whether the device already subscribes to at least one of one or more second services, in response to receiving the service request from the information processing apparatus, the first service including a first function at least partially overlapping a second function of the one or more second services;
causing the device to subscribe to the first service, in a case where it is determined in the determining that the device does not subscribe to any of the one or more second services; and
guiding a cancellation of a subscription for the second service to which the device already subscribes, in a case where it is determined in the determining that the device already subscribes to at least one of the one or more second services.

A fourth aspect of the present disclosure is a service providing method utilized by a server
the service providing method including the steps of:
determining whether a device already subscribes to at least one of one or more second services, in response to receiving a service request intended for a first service from an information processing apparatus, the first service including a first function at least partially overlapping a second function of the one or more second services; causing the device to subscribe to the first service, in a case where it is determined in the determining that the device does not subscribe to any of the one or more second services;
guiding a cancellation of a subscription for the second service to which the device already subscribes, in a case where it is determined in the determining that the device already subscribes to at least one of the one or more second services; and
acquiring information pertaining to the device from the device and providing the first service based on the acquired information, in response to the device being caused to subscribe to the first service in the causing the device to subscribe to the first service.

According to the above aspects, it is possible to prevent the duplicate subscription to the first service and the second service. That is, it is possible to suppress the same type of service menu from being duplicately provided from each of the plurality of services.

BRIEF DESCRIPTION OF DRAWINGS

FIGS. 4A and 4B are a sequence diaphragm showing a part of processing that is performed in the device service system.

FIGS. 6A and 6B are a sequence diaphragm showing a remainder of the processing that is performed in the device service system

DETAILED DESCRIPTION

An example of the present disclosure will be described with reference to the drawings.

1. Example (1-1) Outline of Device Service System

Figure 1:
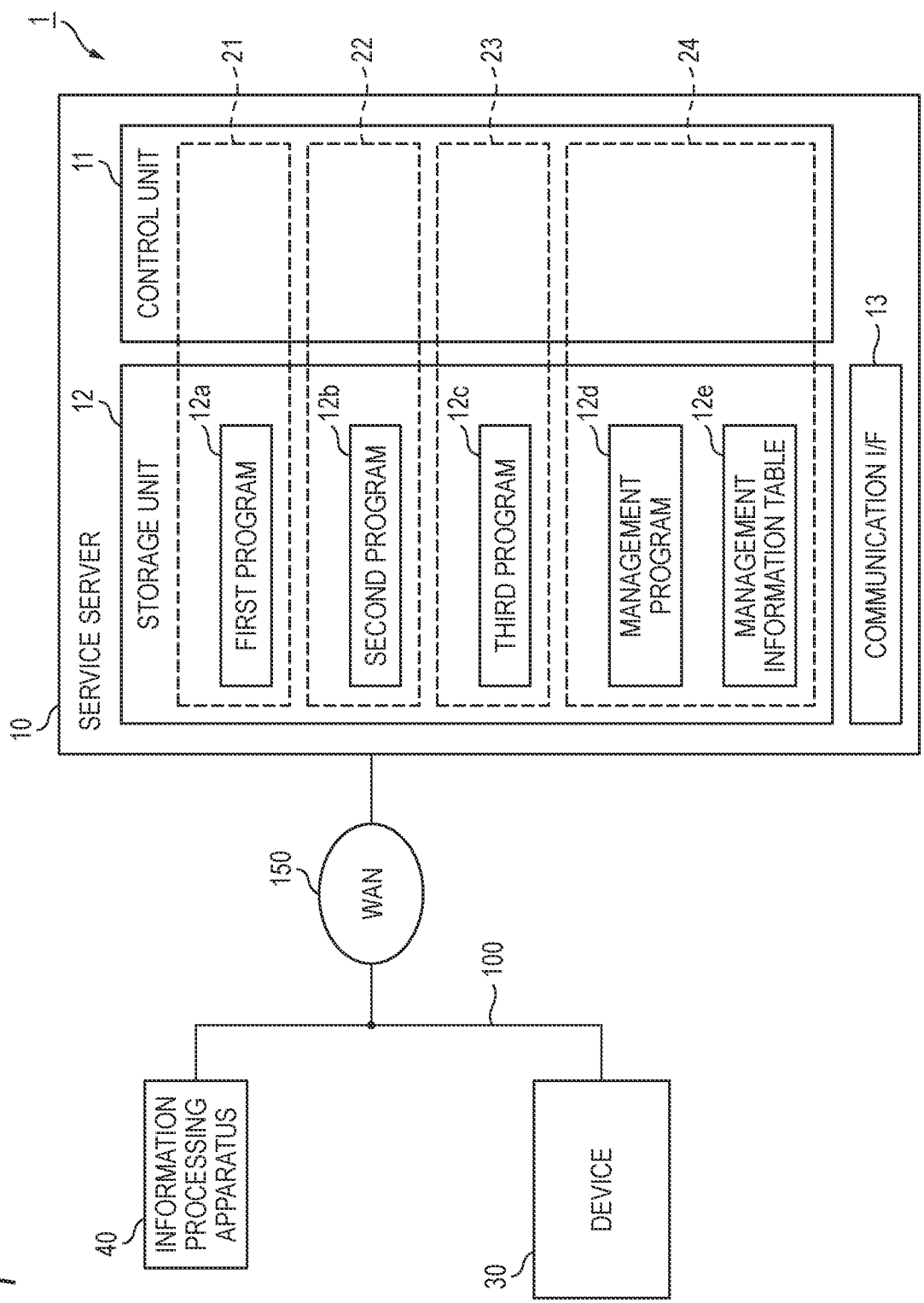
FIG. 1 illustrates an outline of a device service system of an example.

A device service system 1 of the present example shown in FIG. 1 includes a service server 10, a device 30, and an information processing apparatus 40. The device service system 1 can provide a variety of services intended for various devices. In the present example, the diverse services are provided by the service server 10. The service server 10 of the present example can provide, for example, a first service, a second service and a third service.

In the present example, a device that can subscribe to the variety of services is, for example, a device having a printing function, such as a printer and a complex machine. The printing function is a function of acquiring data of an image to be printed and printing an image indicated by the data on a sheet-like to-be-recorded medium. The device 30 has the printing function. Therefore, the device 30 can subscribe to the diverse services. The subscription (registration) for each service is individually performed for each device. A subscriber of one person can conclude a plurality of service subscriptions.

The service server 10 is configured to be able to communicate with each of the device 30 and the information processing apparatus 40. In the present example, the device 30 and the information processing apparatus 40 are connected to a communication network 100.

The communication network 100 is connected to a WAN (Wide Area Network) 150. The service server 10 is connected to the WAN 150. Therefore, in the present example, the service server 10 is configured to be able to communicate with each of the device 30 and the information processing apparatus 40 via the WAN 150 and the communication network 100.

Note that, the service server 10 may also be connected to the communication network 100. The information processing apparatus 40 may be connected to the WAN 150, and may also be connected to the communication network 100 via the WAN 150. The information processing apparatus 40 may also be configured to be able to communicate with the service server 10 without passing through the WAN 150.

The communication network 100 may include a wired network or may include a wireless network. The WAN 150 may be any network. In the present example, the WAN 150 is, for example, the Internet configured to perform communication according to TCP/IP protocols.

(1-2) Configuration of Service Server

As shown in FIG. 1, the service server 10 includes a control unit 11, a storage unit 12 and a communication I/F 13. 'I/F' is an abbreviation of interface.

The control unit 11 includes, for example, a CPU. The storage unit 12 includes, for example, a semiconductor memory such as a ROM, a RAM, an NVRAM and a flash memory. Specifically, the service server 10 of the present example includes a microcomputer having a CPU and a semiconductor memory.

The control unit 11 is configured to execute a program stored in the storage unit 12, thereby implementing various functions. In the present example, the storage unit 12 corresponds to a non-transitory computer-readable storage medium having a program stored thereon. Note that, a variety of functions implemented by the control unit 11 are not limited to the configuration where they are implemented by the execution of the program. For example, some or all of the functions may also be implemented using one or more hardware.

The communication I/F 13 is an interface for performing communication with other apparatuses. The communication I/F 13 may be compatible with a wired LAN, a wireless LAN and a variety of other communication methods, for example. In the present example, the communication I/F 13 is connected to the WAN 150.

In the storage unit 12, a first program 12a, a second program 12b, a third program 12c, a management program 12d, and a management information table 12e are stored. The management information table 12e is managed by the management program 12d.

The first program 12a has a function of providing a first service. That is, the control unit 11 executes the first program 12a, so that a variety of services regarding the first service are implemented.

The second program 12b has a function of providing a second service. That is, the control unit 11 executes the second program 12b, so that a variety of services regarding the second service are implemented.

The third program 12c has a function of providing a third service. That is, the control unit 11 executes the third program 12c, so that a variety of services regarding the third service are implemented.

The management program 12d has a management function of accessorily managing a variety of services that can be provided by the service server 10.

In the present example, a so-called virtual server is established as an example. Specifically, the function of the control unit 11 to provide the first service based on the first program 12a is implemented by a virtual first server 21 in the service server 10. In descriptions below, the description 'first server 21' means 'the control unit 11 configured to provide the first service according to the first program 12a'.

The function of the control unit 11 to provide the second service based on the second program 12b is implemented by a virtual second server 22 in the service server 10. In descriptions below, the description 'second server 22' means 'the control unit 11 configured to provide the second service according to the second program 12b'.

The function of the control unit 11 to provide the third service based on the third program 12c is implemented by a virtual third server 23 in the service server 10. In descriptions below, the description 'third server 23' means 'the control unit 11 configured to provide the third service according to the third program 12c'.

The management function that is provided by the control unit 11 based on the management program 12d is implemented by a virtual management server 24 in the service server 10. In descriptions below, the description 'management server 24' means 'the control unit 11 configured to provide the management function according to the management program 12d'. The management function includes a function of managing registration information of a subscriber (for example, an account, a user ID, a name and the like), a function of managing subscription information for each device registered by the subscriber, and the like, in each of the first to third services.

Figure 3A:
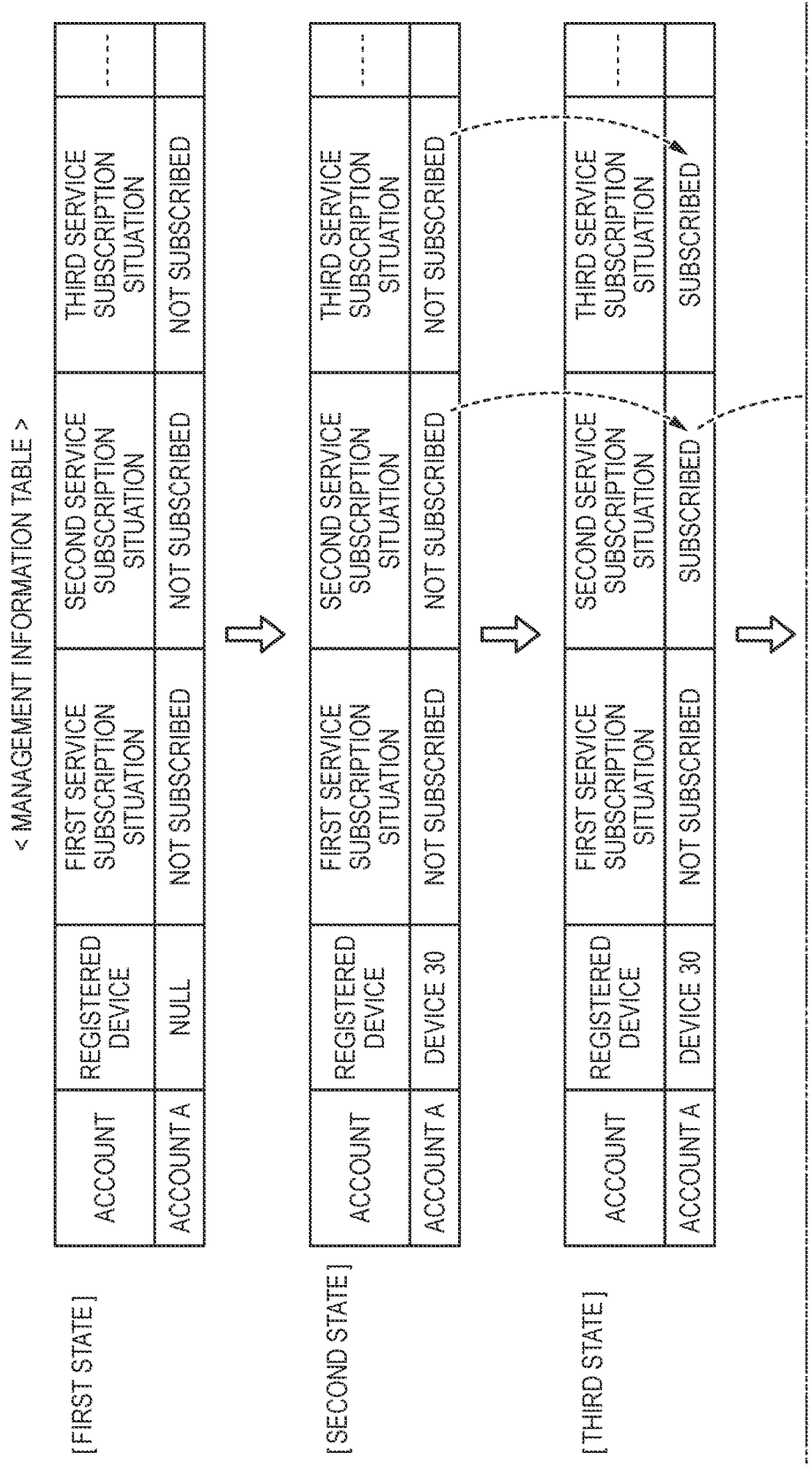
FIGS. 3A and 3B illustrate an example of a management information table.
Figure 3B:
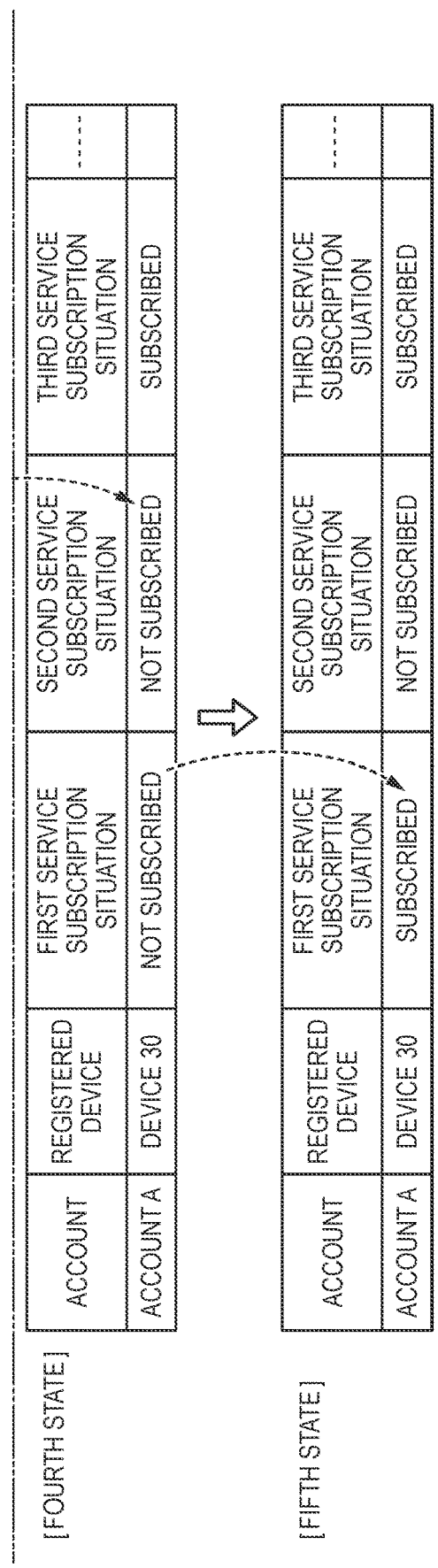
Figure 5A:
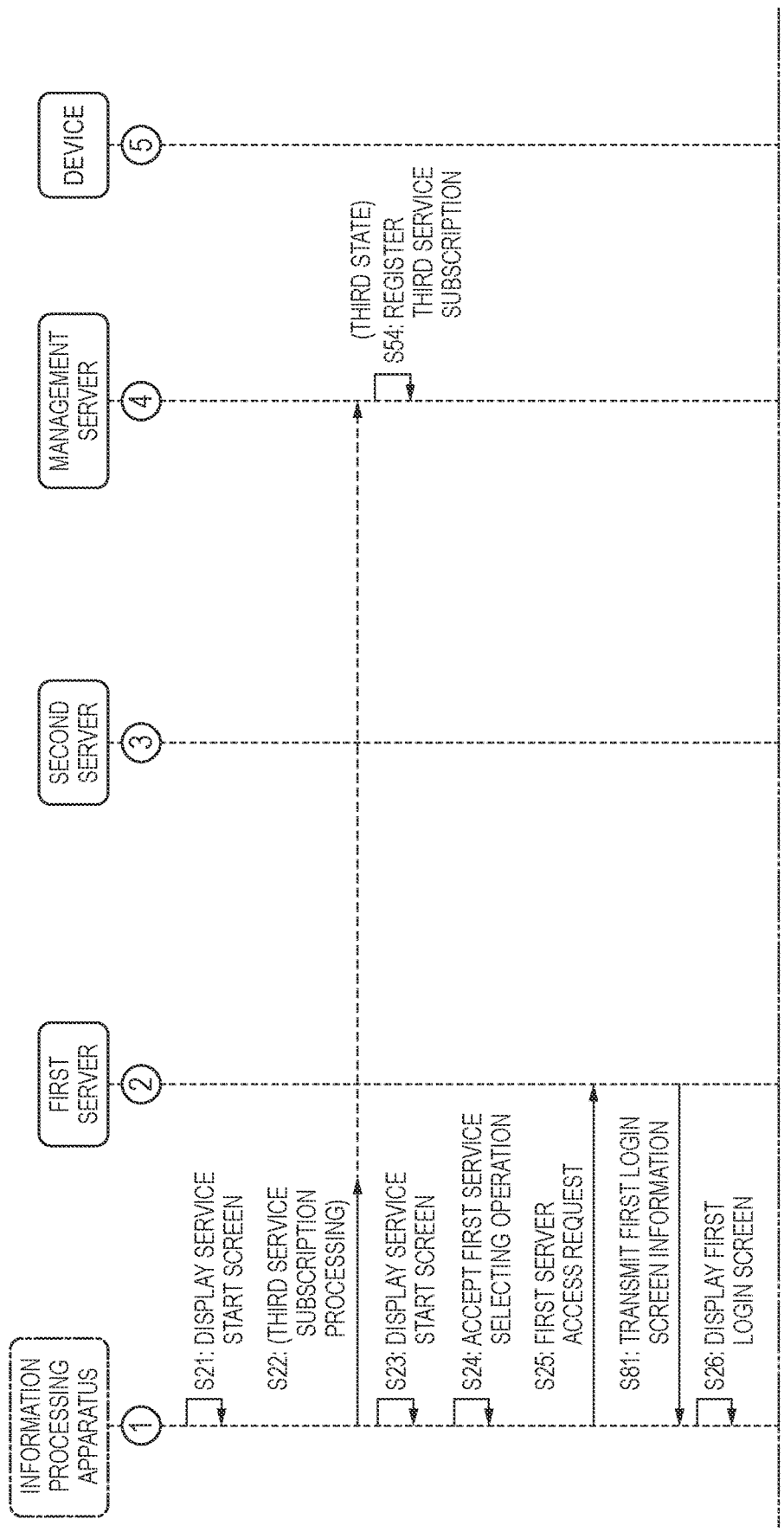
FIGS. 5A and 5B are a sequence diaphragm showing another part of the processing that is performed in the device service system.
Figure 5B:
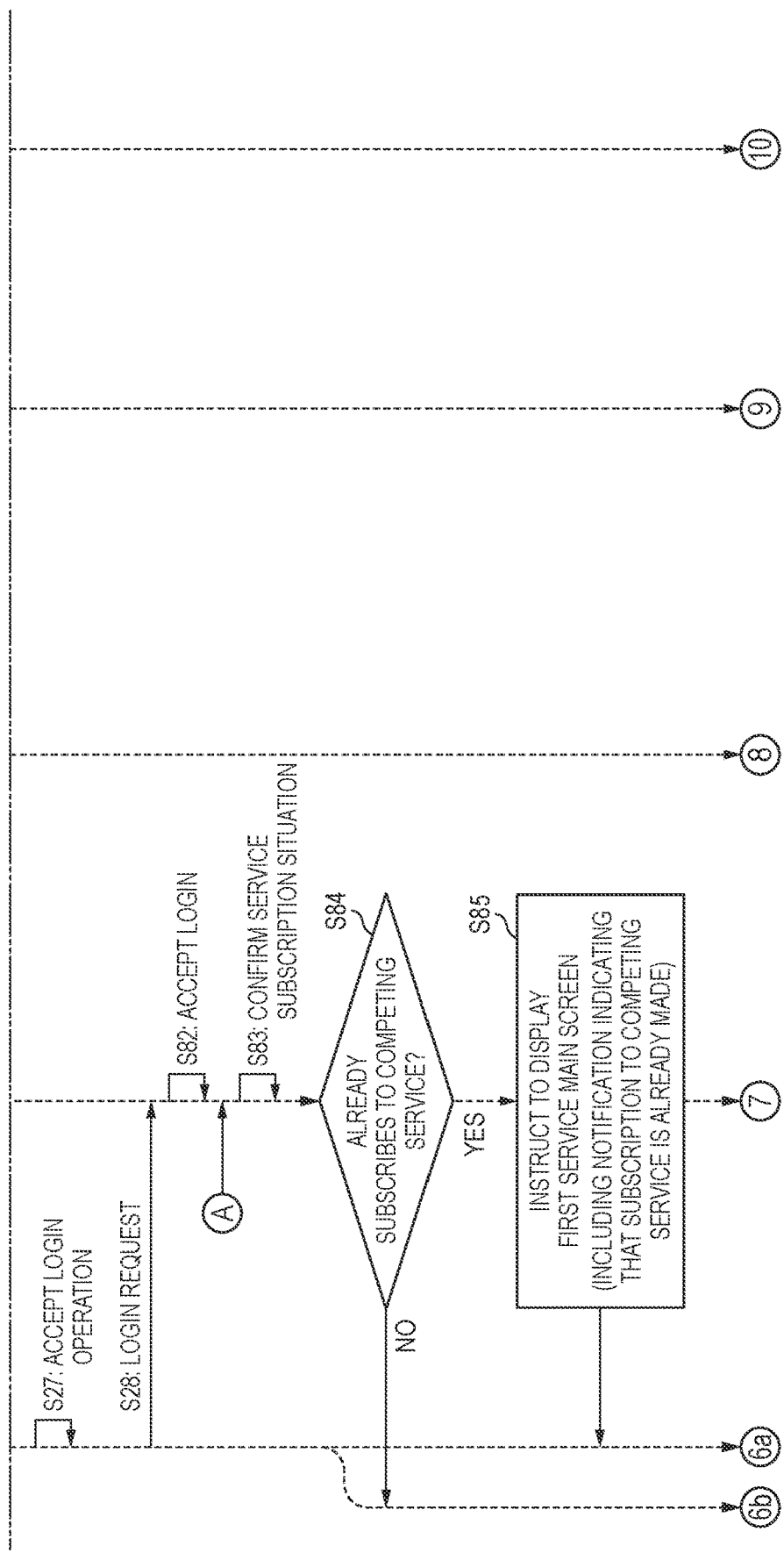

The management information table 12e is generated for each subscriber in the management server 24. As shown in FIGS. 3A and 3B, in the management information table 12e, an account of a subscriber, a device (hereinafter, referred to as registered device) registered by the subscriber, the presence or absence of a subscription (contract) situation to a service of each registered device, and the like are registered.

The first service is more specifically described. The first service of the present example is, for example, a service intended for, particularly, consumables of a device (first subscribed device) subscribing to the first service, and includes a so-called subscription service (flat-rate service). "subscription" includes not only a subscription to a flat-rate service but also a subscription to a service other than the flat-rate service as far as a description indicating the flat-rate service is not cited such as "subscription service". The service other than the flat-rate service includes a service of an automatic ordering of a consumable on a pay-per-consumption basis, and a print service. As well as the above noun "subscription", the verb "subscribe" includes not only "subscribing to the flat-rate service" but also "subscribing to a service other than the flat-rate service".

That is, in the present example, when a subscription to the first service is concluded, a service-dedicated cartridge is provided, as a cartridge where a coloring material (toner or ink) to be used for printing is accommodated. A subscriber mounts the dedicated cartridge to the first subscribed device and uses the first subscribed device. The dedicated cartridge can be used only during the subscription, and can be no longer used when the first service is canceled.

A monthly fee is set as compensation for the first service to the subscriber. Specifically, for each subscription, printing can be performed up to a prescribed number of sheets (for example, M sheets per one month) at a flat rate. When a number of printed sheets within one month exceeds the prescribed number of sheets, an additional fee is charged. For example, a certain fee is additionally charged each time the prescribed number of sheets is exceeded by N sheets. In a case where the number of actually printed sheets for one month is smaller than the prescribed number of sheets, a surplus may be carried over to a next month.

The first server 21 is configured to periodically collect and accumulate various data from the first subscribed device. Specifically, when a subscription to the first service intended for a certain device is concluded, the first server 10 instructs the subscribed first subscribed device to periodically notify notice target information, via the management server 24. The instruction includes a type and a notice interval of the notice target information to be notified. Examples of the notice target information may include the number of printed sheets, a remaining amount of a consumable, a version of firmware, a variety of status information, and the like. The first subscribed device receiving the instruction is configured to periodically transmit the specified notice target information to the first server 21 via the management server 24 at the specified notice interval.

In addition, the first server 21 can issue an action instruction for the first subscribed device. Examples of the action instruction may include an instruction to change a variety of setting values that are used in the first subscribed device, a printing execution instruction, and the like. When the first subscribed device receives the action instruction from the first server 21, the first subscribed device performs processing according to the instruction.

As described above, the remaining amount of the consumable (here, a remaining amount of the coloring material of the dedicated cartridge) is periodically monitored by the first server 21. When the remaining amount falls below a certain level, a new dedicated cartridge is automatically ordered and delivered to the subscriber.

The second service is schematically described. The second service is different from the first service but provides some functions of the first service. That is, the second service provides, for example, a service specialized in automatic ordering of a consumable. The second service does not include a flat-rate service for the number of printed sheets. The first service and the second service overlap, in that automatic ordering of a consumable is performed. Like this, a relationship where the respective functions at least partially overlap among a plurality of different services is called a competitive relationship.

In the present example, a plurality of services having a competitive relationship each other cannot be provided for one same device. Therefore, one device cannot duplicately subscribe to the first service and the second service.

The third service is a service having a competitive relationship with neither the first service nor the second service. The third service may be, for example, a cloud print service. The cloud print service provides a function of providing print data from a remote location to a subscribed device and causing the subscribed device to print the print data.

(1-3) Configuration of Device

Figure 2A:
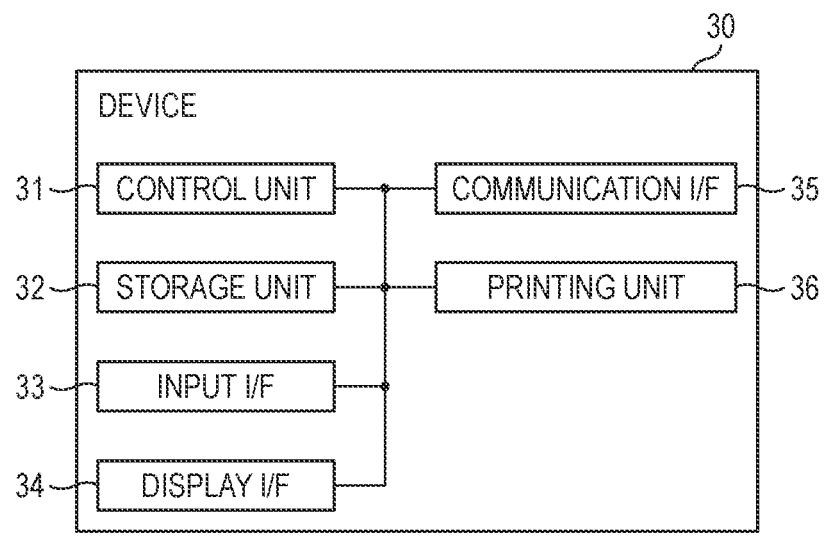
FIG. 2A is a block diagram of a device.

The device 30 is specifically described with reference to FIG. 2A. The device 30 includes a control unit 31, a storage unit 32, an input I/F 33, a display I/F 34, a communication I/F 35 and a printing unit 36.

The control unit 31 includes, for example, a CPU. The storage unit 32 includes, for example, a semiconductor memory such as a ROM, a RAM, an NVRAM and a flash memory. Specifically, the device 30 of the present example includes a microcomputer having a CPU and a semiconductor memory. In the storage unit 32, a variety of software and data are stored. The control unit 31 is configured to execute the various programs stored in the storage unit 32, thereby implementing various functions. Note that, the various functions implemented by the control unit 31 are not limited to the configuration where they are implemented by the execution of the programs (i.e., by software processing). For example, some or all of the functions may also be implemented using one or more hardware.

The input I/F 33 has a device for input for receiving a variety of input operations performed by a user. The device for input provided to the input I/F 33 may include, for example, an operation switch (not shown), a touch panel (not shown), and the like. The display I/F 34 has a display device capable of displaying an image, such as a liquid crystal monitor and an organic EL display, for example. The communication I/F 35 is an I/F for connecting the device 30 to the communication network 100. The printing unit 36 is configured to implement the above-described printing function. The printing unit 36 includes the above-described consumable.

Note that, in the present example, the device 30 is configured to be able to communicate with the service server 10 by using a communication protocol of XMPP (Extensible Messaging and Presence Protocol), for example.

(1-4) Configuration of Information Processing Apparatus

The information processing apparatus 40 is a variety of information processing apparatuses such as a smart phone, a tablet terminal, a mobile personal computer and a stationary personal computer, for example.

Figure 2B:
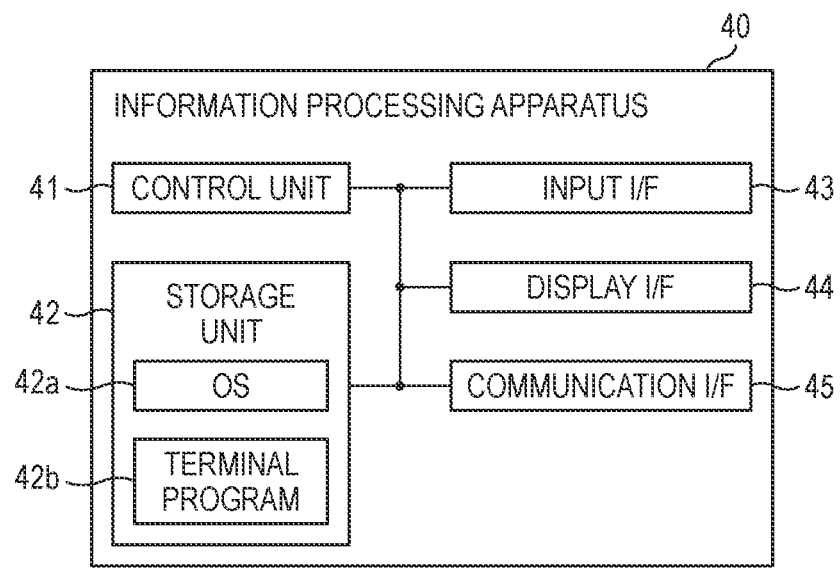
FIG. 2B is a block diagram of an information processing apparatus.

As shown in FIG. 2B, the information processing apparatus 40 includes a control unit 41, a storage unit 42, an input I/F 43, a display I/F 44 and a communication I/F 45.

The control unit 41 includes, for example, a CPU. The storage unit 42 includes, for example, a semiconductor memory such as a ROM, a RAM, an NVRAM and a flash memory. Specifically, the information processing apparatus 40 of the present example includes a microcomputer having a CPU and a semiconductor memory.

The control unit 41 is configured to execute a program stored in the storage unit 42, thereby implementing various functions. In the present example, the storage unit 42 corresponds to a non-transitory computer-readable storage medium having a program stored thereon. Note that, a variety of functions implemented by the control unit 41 are not limited to the configuration where they are implemented by the execution of the program. For example, some or all of the functions may also be implemented using one or more hardware.

The input I/F 43 has a device for input for receiving a variety of input operations performed by a user. The device for input provided to the input I/F 43 includes, for example, a touch panel. The display I/F 44 has a display device capable of displaying an image, such as a liquid crystal monitor and an organic EL display, for example. The communication I/F 45 is an I/F for connecting the information processing apparatus 40 to the communication network 100.

In the storage unit 42, an OS 42a and a terminal program 42b are stored. The OS 42a and the terminal program 42b are installed in a computer system.

The terminal program 42b is used to enjoy a variety of services that are provided by the service server 10. The service subscriber can acquire a variety of information pertaining to the service concluded by the subscriber by accessing the service server 10. One of tools configured to acquire the various information is the terminal program 42b. The terminal program 42b has a function of acquiring and displaying, on the display I/F 44, the various information pertaining to the subscription service by communicating with the service server 10 (specifically, communicating with the respective servers 21 to 24). In addition, the terminal program 42b has a function of transmitting, to the service server 10, various information, requests and the like input via the input I/F 43 by a user such as an administrator.

In the present example, the terminal program 42b has, for example, a function of a Web browser. Note that, the respective servers 21 to 24 of the service server 10 have, for example, a function of a Web server. Therefore, the terminal program 42b of the present example is configured to communicate with the respective servers 21 to 24 by using a communication protocol of HTTP or HTTPS, for example.

(1-5) Flow of Service Subscription

Next, an example of a procedure of subscribing to a variety of services for a device, which is implemented in the device service system 1 of the present example, is described with reference to FIGS. 4A to 6B. FIGS. 4A to 6B exemplify a flow of processing that is performed when a user who has not registered an account first subscribes to the second service for the device 30, then subscribes to the third service and then subscribes to the first service.

The user who wants to subscribe to the second service to the device 30 activates the terminal program 42b (for example, a Web browser, in the present example) on the information processing apparatus 40 and accesses and causes the management server 24 to display a service start screen 50 (refer to FIG. 7) on the display I/F 44 of the information processing apparatus 40 (S11).

Figure 7:
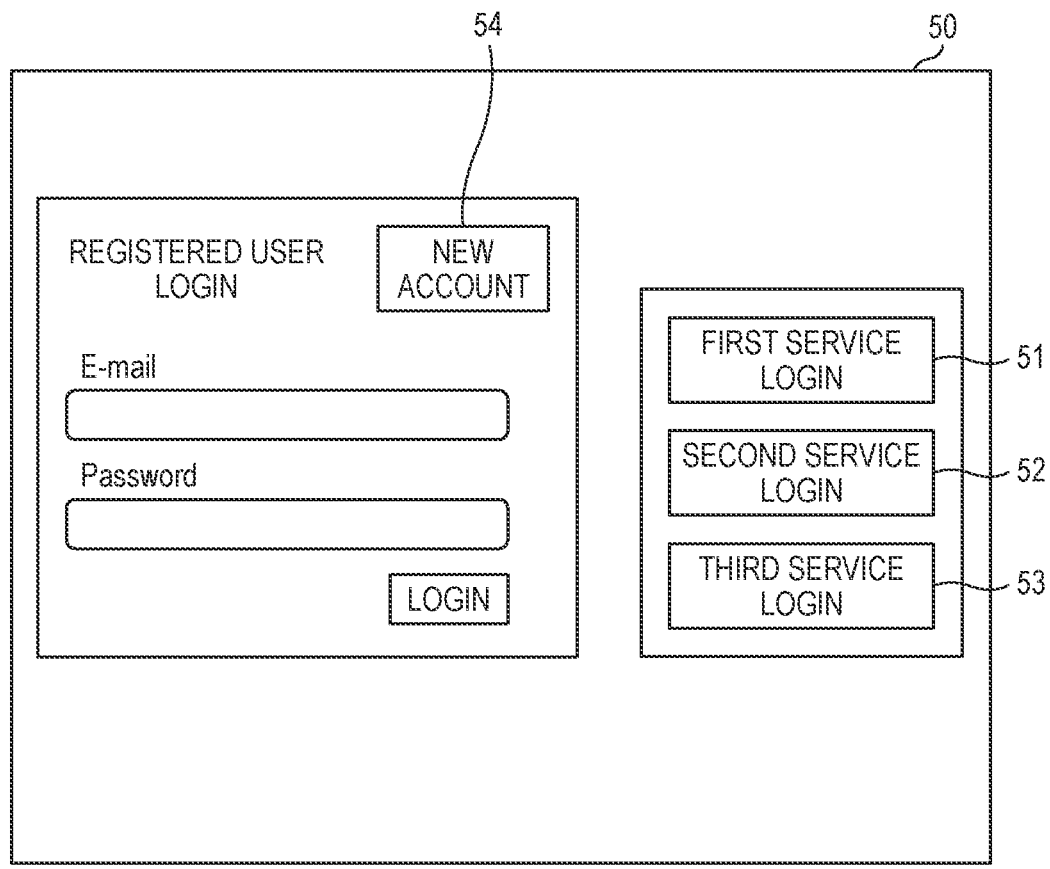
FIG. 7 illustrates an example of a service start screen.

On the service start screen 50 shown in FIG. 7, when the user taps or clicks an account registering button 54, the user can proceed to registration of an account. A first button 51 is a button for logging to the first service. A second button 52 is a button for logging to the second service. A third button 53 is a button for logging to the third service. Note that, the user can also proceed to registration of an account by tapping or clicking any one of the first to third buttons 51 to 53.

Here, since the user has a plan to subscribe to the second service, the user operates to select the second service, that is, taps or clicks the second button 52. When the terminal program 42b accepts the operation of selecting the second service (S12), the terminal program transmits a second server access request to the management server 24 (S13). The second server access request is to request the second server 22 for access to the second server 22.

The second server 22 receiving the second server access request transmits second login screen information to the terminal program 42b (S61). The second login screen information is information for displaying a second login screen (not shown). The second login screen is a screen for accepting a user operation for logging to the second server 22 or a user operation for registering an account.

The terminal program 42b displays a second login screen on the display I/F 44, in response to receiving the second login screen information from the second server 22 (S14). Here, the user performs an operation for registering an account. Specifically, the user requests account registration, and inputs information (account information) necessary for account registration to an account information input screen that is displayed in response to the request. The terminal program 42b accepts the account information input by the user (S15). The terminal program 42b accepting the account information transmits the account information to the second server 22 and requests account registration (S16).

The second server 22 receiving the account information and the account registration request from the terminal program 42b registers an account, in response to the request (S62). The second server 22 registering the account notifies the management server 24 of the registered account information to (S63). The management server 24 receiving the notification of the account information registers the account information (S51). This causes the management server 24 to newly generate a management information table (refer to FIGS. 3A and 3B) corresponding to the account newly registered this time. A management state of the account in the management server 24 at this point of time is called 'first state'. In the first state, the account has just been newly registered, and as shown in FIGS. 3A and 3B, the device has not been registered yet and has not subscribed to any service yet.

The user who has registered the account acquires device information necessary for device registration from the device 30, so as to register a device, which is a subscription target for a service, in the system. By performing an operation of requesting device registration, the terminal program 42b is caused to display a device registering screen (not shown) for device registration. The user performs a variety of device registering operations, including inputting the device information acquired from the device, starting from the device registering screen.

The terminal program 42b accepts the device registering operation performed by the user (S17). Then, the terminal program transmits a device registration request to the second server 22, together with the device information input by the user (S18).

The second server 22 receiving the device registration request receives and registers the transmitted device information (S64). In addition, the second server 22 notifies the management server 24 of the registered device information (S65). The management server 24 receiving the notification registers the device information. A management state of the account in the management server 24 at this point of time is called 'second state'. In the second state, since the device 30 has been registered, the device 30 is registered as a registered device, as shown in FIGS. 3A and 3B. This allows the device 30 to subscribe to any one service.

When the device registration is completed, the second server 22 causes the information processing apparatus 40 to display a screen for urging subscription to the second service. The user performs a variety of subscription operations, including inputting subscription information necessary for subscription to the second service. The terminal program 42b accepts the subscription operation to the second service performed by the user (S19). Then, the terminal program transmits a second service subscription request to the second server 22, together with the subscription information input by the user (S20).

The second server 22 receiving the second service subscription request receives the transmitted subscription information, and registers subscription of the device 30 to the second service, based on the subscription information (S66). In addition, the second server 22 notifies the management server 24 of the subscription information of the device 30 (S67). The management server 24 receiving the notification formally registers the subscription of the device 30 to the second service (S53).

The user who has completed the subscription to the second service performs a variety of operations necessary for subscription to the third service, so as to further subscribe the device 30 to the third service. Specifically, the user causes the service start screen 50 shown in FIG. 7 to be displayed on the display I/F 44 (S21). Then, starting from the service start screen 50, the user performs a subscription operation to the third service. This subscription operation includes, for example, an operation of tapping or clicking the third button 53 on the service start screen 50. The terminal program 42b performs third service subscription processing for causing the device 30 to subscribe to the third service by communicating with the third server 23, according to the subscription operation (S22). A result of the subscription processing is notified to the management server 24, so that the management server 24 formally registers the subscription of the device 30 to the third service (S54).

A management state of the account in the management server 24 at this point of time is called 'third state'. In the third state, since the device 30 has subscribed to the second service and the third service, subscription situations to the second service and the third service are all set to 'subscribed', as shown in FIGS. 3A and 3B.

Next, the user who wants to subscribe the device 30 to the first service causes the service start screen 50 of FIG. 7 to be displayed on the display I/F 44 (S23). Then, the user operates to select the first service, that is, taps or clicks the first button 51. When the terminal program 42b receives the operation of selecting the first service (S24), the terminal program transmits a first server access request to the management server 24 (S25). The first server access request is to request the first server 21 for access to the first server 21.

The first server 21 receiving the first server access request transmits first login screen information to the terminal program 42b (S81). The first login screen information is information for displaying a first login screen (not shown). The first login screen is a screen for accepting a user operation for logging to the first server 21 or a user operation for registering an account.

The terminal program 42b displays the first login screen on the display I/F 44, in response to receiving the first login screen information from the first server 21 (S26). On the first login screen, the user performs a login operation for logging to the first server 21. The login operation includes inputting the registered account information. The terminal program 42b accepts the login operation performed by the user (S27). Then, the terminal program transmits a login request to the first server 21, together with the accepted information (S28). The first server 21 receiving the login request accepts a login to the first server 21. Then, the first server confirms a service subscription situation of the device (S83). Specifically, the first server confirms a subscription situation to another service other than the first service.

Based on a confirmation result in S83, the first server 21 determines whether the device 30 already subscribes to another service (competing service) having a competitive relationship with the first service (S84). In the present example, the device 30 already subscribes to the second and third services at this point of time. The second service of the second and third services has a competitive relationship with the first service.

When the device 30 has not subscribed to another service in competition with the first service, the first server 21 allows subscription to the first service and registers subscription to the first service via a user operation, which will be described later. On the other hand, when the device 30 already subscribes to the competing service (S84: YES), the first server 21 does not allow subscription to the first service at this point of time, and guides the user to cancel the competing service to which the device already subscribes. That is, shift to the subscription procedure to the first service is not allowed, as long as the subscription to the competing service is maintained.

More specifically, in the present example, by transmitting, to the terminal program 42b, screen information for causing a first service main screen 60 (refer to FIG. 8) to be displayed on the information processing apparatus 40, display of the first service main screen 60 is instructed (S85). The terminal program 42b receiving this instruction displays the first service main screen 60 on the display i/F 44 (S31).

Figure 8:
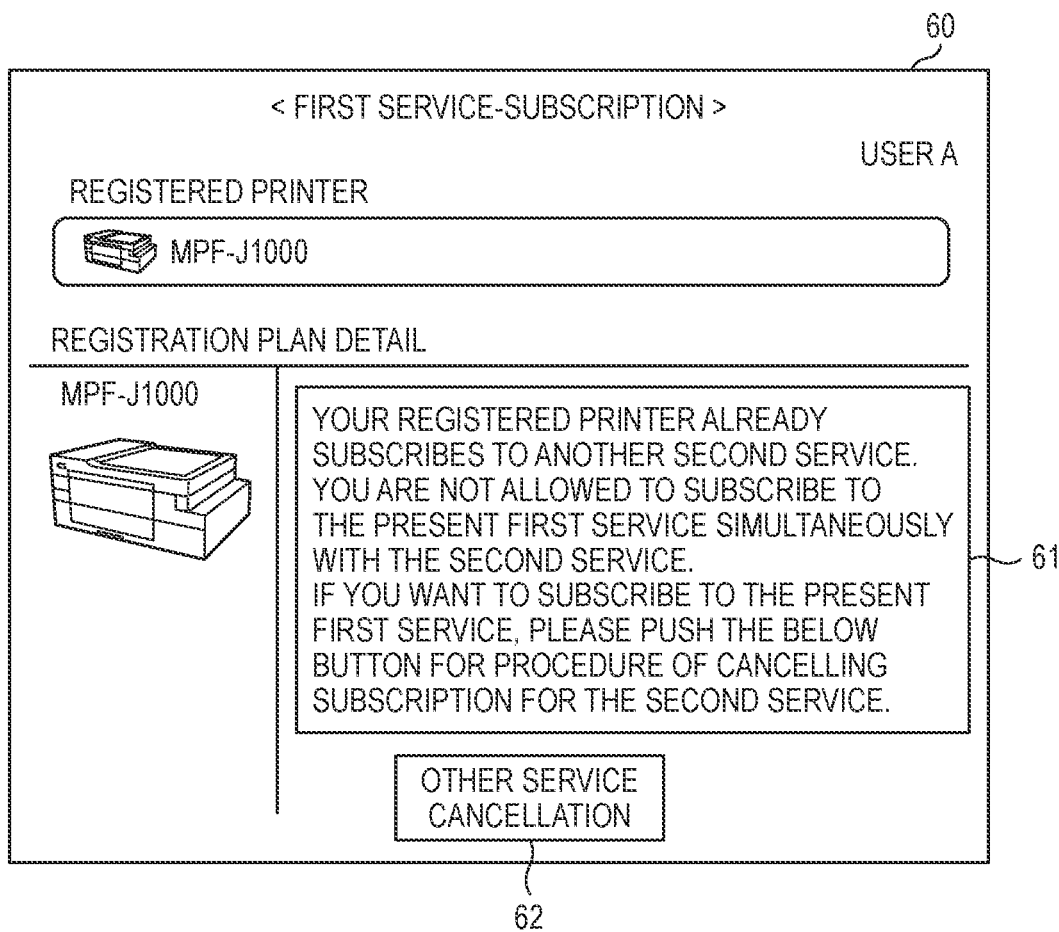
FIG. 8 illustrates an example of a first service main screen.

On the first service main screen 60 that is displayed at this time, an other service cancellation message 61 and an other service cancellation button 62 are displayed, as shown in FIG. 8. The other service cancellation message 61 includes a first message, which indicates that the device 30 already subscribes to the second service having a competitive relationship with the first service, and a second message for referring to a cancellation of the subscription for the second service having the competitive relationship. The other service cancellation button 62 is a button for accepting a user's intention to request a cancellation of the subscription for the subscribed competing service. By seeing the other service cancellation message 61, the user can recognize that the device 30 already subscribes to the second service in competition with the first service and that it is necessary to cancel the subscription for the second service so as to subscribe to the first service.

The user who wants to prioritize the first service over the second service performs an operation of requesting a cancellation of the subscription for the competing service, i.e., taps or clicks the other service cancellation button 62. In response to receiving the operation of requesting the cancellation (S32), the terminal program 42b transmits a competing service cancellation request to the first server 21 (S33).

When the first server 21 receives the competing service cancellation request, the first server notifies the second server 22 configured to provide the second service of a cancellation target that the cancellation request has been received (S86). The second server 22 receiving the notification instructs display of a second service main screen 70 by transmitting, to the terminal program 42b, screen information for displaying the second service main screen 70 (S68). The terminal program 42b receiving this instruction displays the second service main screen 70 on the display I/F 44 (S34).

Figure 9:
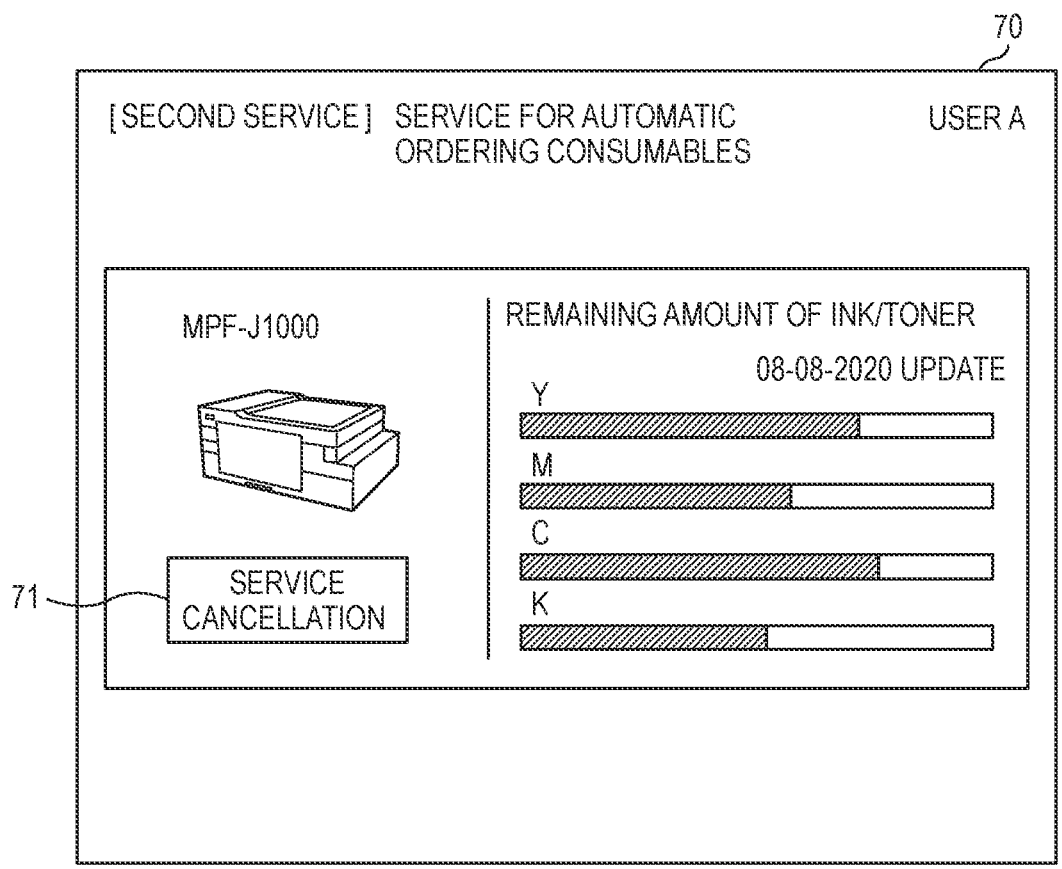
FIG. 9 illustrates an example of a second service main screen.

On the second service main screen 70 that is displayed at this time, a service cancellation button 71 is displayed, as shown in FIG. 9. The service cancellation button 71 is a button for accepting a second service cancellation request.

The user who wants to cancel the subscription for the second service so as to subscribe to the first service performs an operation of instructing a cancellation of the subscription for the second service, i.e., taps or clicks the service cancellation button 71. In response to receiving the operation of instructing the cancellation (S35), the terminal program 42b transmits a second service cancellation request to the second server 22 (S36).

When the second server 22 receives the cancellation request, the second server registers cancellation of the second service for the device 30 (S69). Then, the second server notifies the management server 24 of the cancellation of the second service for the device 30 (S70).

The management server 24 receiving the cancellation notification of the second service from the second server 22 formally registers the cancellation of the second service for the device 30 (S55). A management state of the account in the management server 24 at this point of time is called 'fourth state'. In the fourth state, since the subscription to the second service for the device 30 has been canceled, the subscription situation to the second service is set to 'not subscribed', as shown in FIGS. 3A and 3B.

The management server 24 formally registering the cancellation of the second service for the device 30 notifies the first server 21 that the cancellation of the second service has been completed (S56). The first server 21 receiving this notification again performs the processing of S83 and thereafter.

In S84, when the device 30 has not subscribed to a service in competition with the first service (S84: NO), the first server 21 instructs the terminal program 42b to display a first service main screen. The terminal program 42b receiving this instruction displays the first service main screen on the display I/F 44 (S41).

The first service main screen that is here displayed is similar to the first service main screen 60 shown in FIG. 7, in terms of the basic screen configuration, but does not display the other service cancellation message 61 and the other service cancellation button 62. Here, a message for urging the user to subscribe to the first service and a subscription request button for accepting a subscription request for the first service are displayed.

The user who wants to cause the device 30 to subscribe to the first service performs a subscription operation to the first service. Specifically, the user taps or clicks a subscription request button. The terminal program 42b accepting the subscription operation (S42) transmits a first service subscription request to the first server 21, together with the subscription information of the user (S43).

The first server 21 receiving the first service subscription request receives the transmitted subscription information, and registers subscription of the device 30 to the first service, based on the subscription information (S91). In addition, the first server 21 notifies the management server 24 of the subscription information of the device 30 (S92). The management server 24 receiving this notification formally registers the subscription of the device 30 to the first service (S57). A management state of the account in the management server 24 at this point of time is called 'fifth state'. In the fifth state, since the subscription to the first service for the device 30 has been registered, the subscription situation to the first service is set to 'subscribed', as shown in FIGS. 3A and 3B.

Note that, in the present example, the service server 10 corresponds to an example of the server of the present disclosure. The first program 12a configured to provide the first service corresponds to an example of the computer-readable instructions of the present disclosure. The first server 21 corresponds to an example of the first service providing unit of the present disclosure. The second server 22 corresponds to an example of the second service providing unit of the present disclosure. The first service main screen 60 of FIG. 8 corresponds to an example of the first screen of the present disclosure. The other service cancellation button 62 of FIG. 8 corresponds to an example of the first cancellation request image of the present disclosure. The second service main screen 70 of FIG. 9 corresponds to an example of the second screen of the present disclosure. The cancellation button 71 of FIG. 9 corresponds to an example of the second cancellation request image of the present disclosure. The information that is transmitted to the first server 21 in S33 corresponds to an example of the first cancellation request information of the present disclosure. The information that is transmitted to the second server 22 in S36 corresponds to an example of the second cancellation request information of the present disclosure.

The processing of S28 corresponds to an example of the service request processing (the transmitting of a specific service request intended for a first service) of the present disclosure. The processing of S83 to S84 corresponds to an example of the determining of the present disclosure. The processing of S85 and S86 corresponds to an example of the guiding of the present disclosure. The processing of S91 corresponds to an example of the causing the device to subscribe to the first service of the present disclosure. Note that, in the above-described example, it has been shown that both the processing of S85 and S86 is performed as an example of the guiding. However, at least one processing of S85 and S86 may be performed as the guiding.

2. Other Examples

Although the above example of the present disclosure has been described, the present invention is not limited to the above-described example and can be variously modified and implemented.

(2-1) In a case where the user already subscribes to a separate service having a competitive relationship with a service to which the user wants to subscribe (contract), a cancellation of the subscription for the separate competing service may be guided to the user by any method.

For example, a message corresponding to the other service cancellation message 61 may be simply displayed.

In addition, for example, the second service main screen of FIG. 9 or a similar screen thereto may be displayed to urge a cancellation of the subscription for the second service, without displaying the other service cancellation button 62 (i.e., without waiting for the user operation). At this time, the other service cancellation message 61 may be temporarily displayed before displaying the second service main screen 70, or the second service main screen may be displayed without displaying the other service cancellation message 61.

(2-2) The 'competitive relationship' may be arbitrarily defined. That is, the competitive relationship is not limited to the overlapping of the function as described in the example. For example, it may be determined as being in the 'competitive relationship' when they have a specific relationship each other.

(2-3) The respective servers 21 to 23 configured to provide services may have a function of the management server 24. That is, the respective servers 21 to 23 may be configured to share subscription information each other, while omitting the management server 24.

(2-4) The respective servers 21 to 24 of the service server 10 may be configured by a plurality of servers that is physically different, instead of the virtual servers.

(2-5) In the above-described example, the plurality of functions of one constitutional element may be implemented by the plurality of constitutional elements, or one function of one constitutional element may be implemented by the plurality of constitutional elements. In addition, the plurality of functions of the plurality of constitutional elements may be implemented by one constitutional element, or one function that is implemented by the plurality of constitutional elements may be implemented by one constitutional element. Further, some of the configurations of the above-described example may be omitted. In addition, at least some of the configurations of the above-described example may be added or replaced with respect to other examples.

What is claimed is:

1. A non-transitory computer-readable storage medium storing computer-readable instructions, wherein the computer-readable instructions, when executed by a computer of a server, cause the server to perform:
   determining whether a printing device already subscribes to at least one of one or more second services, in response to receiving a service request intended for a first service from an information processing apparatus, the first service including a first function at least partially overlapping a second function of a second service of the one or more second services; and
   guiding a cancellation of a subscription for the second service to which the printing device already subscribes, in a case where it is determined in the determining that the printing device already subscribes to the second service; and
   in a case where the computer-readable instructions cause the server to perform the guiding, the server transmits information to the information processing apparatus to display, on the display, a first screen to inform that the printing device already subscribes to the second service; and
   wherein the first screen includes a first cancellation request object,
   the first cancellation request object is an object for accepting a request for a procedure of cancelling the subscription for the second service to which the printing device already subscribes, and
   the information processing apparatus is configured, in response to accepting an operation of selecting the first cancellation request object, to transmit first cancellation request information, which indicates that the first cancellation request object is selected, to the server.

2. The non-transitory computer-readable storage medium according to claim 1,
   wherein the first screen includes a first message indicating that the printing device already subscribes to the second service.

3. The non-transitory computer-readable storage medium according to claim 1,
   wherein the first screen includes a second message for referring to a cancellation of the subscription for the second service to which the printing device already subscribes.

4. The non-transitory computer-readable storage medium according to claim 3,
   wherein the first screen includes a second message for referring to a cancellation of the subscription for the second service to which the printing device already subscribes.

5. The non-transitory computer-readable storage medium according to claim 1,
   wherein in a case where the computer-readable instructions cause the server to perform the guiding, the server transmits information to the information processing apparatus to display, on the display, a second screen about the second service to which the printing device already subscribes, in response to receiving the first cancellation request information from the information processing apparatus,
   the second screen includes a second cancellation request object for accepting an instruction of cancelling the subscription for the second service to which the printing device already subscribes, and
   the information processing apparatus is configured, in response to accepting an operation of selecting the second cancellation request object, to transmit second cancellation request information, which indicates that the second cancellation request object is selected, to the server.

6. The non-transitory computer-readable storage medium according to claim 2,
   wherein in a case where the computer-readable instructions cause the server to perform the guiding, the server transmits information to the information processing apparatus to display, on the display, a second screen about the second service to which the printing device already subscribes, in response to receiving the first cancellation request information from the information processing apparatus,
   the second screen includes a second cancellation request object for accepting an instruction of cancelling the subscription for the second service to which the printing device already subscribes, and
   the information processing apparatus is configured, in response to accepting an operation of selecting the second cancellation request object, to transmit second cancellation request information, which indicates that the second cancellation request object is selected, to the server.

7. The non-transitory computer-readable storage medium according to claim 3,
wherein in a case where the computer-readable instructions cause the server to perform the guiding, the server transmits information to the information processing apparatus to display, on the display, a second screen about the second service to which the printing device already subscribes, in response to receiving the first cancellation request information from the information processing apparatus,
the second screen includes a second cancellation request object for accepting an instruction of cancelling the subscription for the second service to which the printing device already subscribes, and
the information processing apparatus is configured, in response to accepting an operation of selecting the second cancellation request object, to transmit second cancellation request information, which indicates that the second cancellation request object is selected, to the server.

8. The non-transitory computer-readable storage medium according to claim 4,
wherein in a case where the computer-readable instructions cause the server to perform the guiding, the server transmits information to the information processing apparatus to display, on the display, a second screen about the second service to which the printing device already subscribes, in response to receiving the first cancellation request information from the information processing apparatus,
the second screen includes a second cancellation request object for accepting an instruction of cancelling the subscription for the second service to which the printing device already subscribes, and
the information processing apparatus is configured, in response to accepting an operation of selecting the second cancellation request object, to transmit second cancellation request information, which indicates that the second cancellation request object is selected, to the server.

9. The non-transitory computer-readable storage medium according to claim 1,
wherein the computer-readable instructions cause the server to further perform:
causing the printing device to subscribe to the first service, in a case where it is determined in the determining that the printing device does not subscribe to any of the one or more second services.

10. A server comprising:
a service providing unit configured to perform:
determining whether a printing device already subscribes to at least one of one or more second services, in response to receiving a service request intended for a first service from an information processing apparatus, the first service including a first function at least partially overlapping a second function of a second service of the one or more second services;
causing the printing device to subscribe to the first service, in a case where it is determined in the determining that the printing device does not subscribe to any of the one or more second services; and
guiding a cancellation of a subscription for the second service to which the printing device already subscribes, in a case where it is determined in the determining that the printing device already subscribes to the second service; and
in a case where the service providing unit performs the guiding, the service providing unit transmits information to the information processing apparatus to display, on a display, a first screen to inform that the printing device already subscribes to the second service; and
wherein the first screen includes a first cancellation request object,
the first cancellation request object is an object for accepting a request for a procedure of cancelling the subscription for the second service to which the printing device already subscribes, and
the information processing apparatus is configured, in response to accepting an operation of selecting the first cancellation request object, to transmit first cancellation request information, which indicates that the first cancellation request object is selected, to the service providing unit.

11. A service system comprising:
a server system,
a printing device, and
an information processing apparatus,
wherein the information processing apparatus is configured to perform transmitting a service request intended for a first service to the server system, and
the server system is configured to perform:
determining whether the printing device already subscribes to at least one of one or more second services, in response to receiving the service request from the information processing apparatus, the first service including a first function at least partially overlapping a second function of a second service of the one or more second services;
causing the printing device to subscribe to the first service, in a case where it is determined in the determining that the printing device does not subscribe to any of the one or more second services; and
guiding a cancellation of a subscription for the second service to which the printing device already subscribes, in a case where it is determined in the determining that the printing device already subscribes to the second service; and
in a case where the server system performs the guiding, the server system transmits information to the information processing apparatus to display, on a display, a first screen to inform that the printing device already subscribes to the second service; and
wherein the first screen includes a first cancellation request object,
the first cancellation request object is an object for accepting a request for a procedure of cancelling the subscription for the second service to which the printing device already subscribes, and
the information processing apparatus is configured, in response to accepting an operation of selecting the first cancellation request object, to transmit first cancellation request information, which indicates that the first cancellation request object is selected, to the server system.

12. A service providing method utilized by a server,
the service providing method comprising the steps of:
determining whether a printing device already subscribes to at least one of one or more second services, in response to receiving a service request intended for a first service from an information processing apparatus, the first service including a first function at least partially overlapping a second function of a second service of the one or more second services;

causing the printing device to subscribe to the first service, in a case where it is determined in the determining that the printing device does not subscribe to any of the one or more second services;

guiding a cancellation of a subscription for the second service to which the printing device already subscribes, in a case where it is determined in the determining that the printing device already subscribes to the second service; and acquiring information pertaining to the printing device from the printing device and providing the first service based on the acquired information, in response to the printing device being caused to subscribe to the first service in the causing the printing device to subscribe to the first service; and in conjunction with the server performing the guiding, the server transmits information to the information processing apparatus to display, on a display, a first screen to inform that the printing device already subscribes to the second service; and wherein the first screen includes a first cancellation request object, the first cancellation request object is an object for accepting a request for a procedure of cancelling the subscription for the second service to which the printing device already subscribes, and the information processing apparatus is configured, in response to accepting an operation of selecting the first cancellation request object, to transmit first cancellation request information, which indicates that the first cancellation request object is selected, to the server.

13. The service providing method according to claim 12, wherein the first screen includes a first message indicating that the printing device already subscribes to the second service.

14. The service providing method according to claim 12, wherein the first screen includes a second message for referring to a cancellation of the subscription for the second service to which the printing device already subscribes.

\* \* \* \* \*